Aug. 26, 1958  G. K. NEWELL  2,849,091
FLUID PRESSURE BRAKE CYLINDER APPARATUS FOR USE
WITH COMPOSITION BRAKE SHOES
ON RAILWAY CARS
Filed Sept. 26, 1956

INVENTOR.
George K. Newell
BY
Adelbert O. Steinmiller
Attorney

United States Patent Office 2,849,091
Patented Aug. 26, 1958

2,849,091

FLUID PRESSURE BRAKE CYLINDER APPARATUS FOR USE WITH COMPOSITION BRAKE SHOES ON RAILWAY CARS

George K. Newell, Pitcairn, Pa., assignor to Westinghouse Air Brake Company, Wilmerding, Pa., a corporation of Pennsylvania Application September 26, 1956, Serial No. 612,162

3 Claims. (Cl. 188—153)

This invention relates to fluid pressure brake apparatus and more particularly to such apparatus especially adapted for use in conjunction with composition brake shoes on railway vehicles.

Brake shoes of composition friction material have in recent years been developed for use on railway cars in substitution for the well-known cast iron brake shoes. These composition brake shoes, in addition to having longer wear life, have higher friction coefficients than do cast iron brake shoes, and therefore create higher braking forces per unit of applying force than do cast iron shoes. Due to the increase of braking force afforded by the composition brake shoes and in the interest of space conservation and reduction in weight of brake rigging, it has been proposed that the size of brake cylinder employed for actuation of these shoes be reduced, with consequent reduction in actuating forces delivered to the brake rigging during such actuation. It is feared, however, that if a heavy accumulation of ice should build up on the brake rigging during severe winter weather conditions, such rigging could become so ice-bound that it might not be freed and actuated by the proposed smaller brake cylinders upon initiation of a brake application.

Accordingly it becomes a prime object of the present invention to provide means whereby a brake cylinder of reduced size may be employed for brake-applying actuation of composition brake shoes with the assurance that such actuation can be effected even though the brake rigging linking such brake cylinder to the brake shoes be heavily iced.

Figure 1:
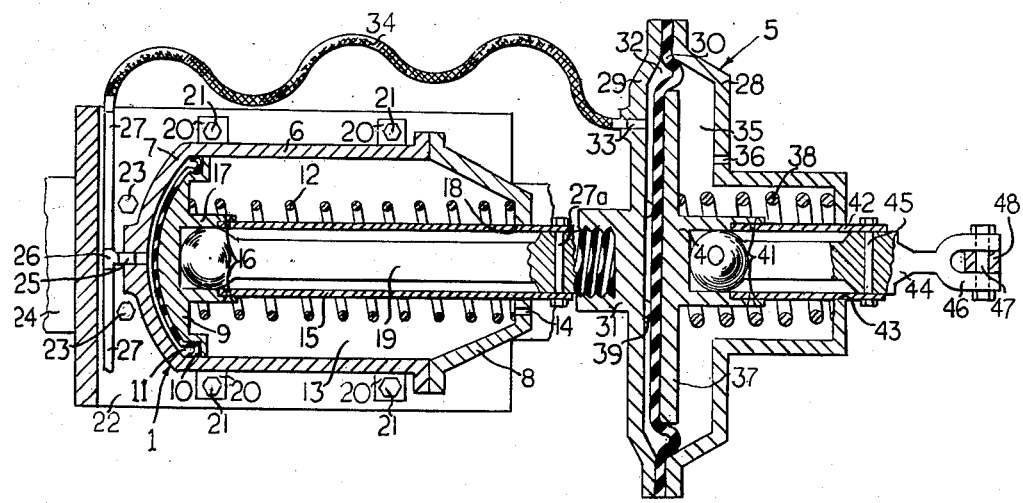
Figure 2:
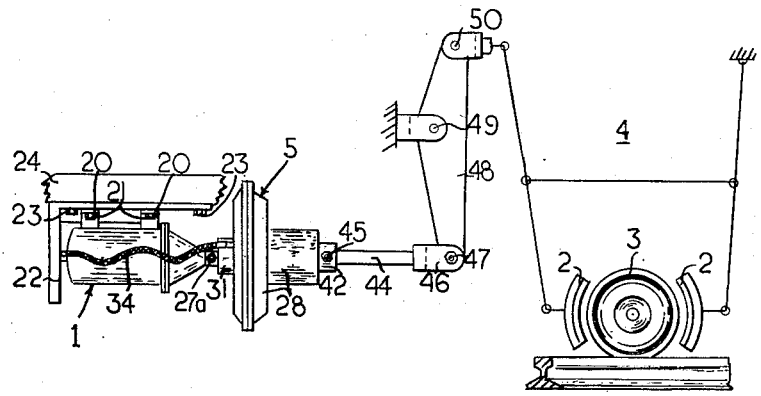

Other objects and advantages of the invention will become apparent from the following more detailed description of the invention when taken in connection with the accompanying drawing in which:

Fig. 1 is a schematic represetation, partly in outline and partly in section, showing structural details of the invention in a preferred form; and Fig. 2 is a schematic representation showing in outline the invention as same may be applied to operation of brake shoes on a railway car.

Description

Referring to the drawing, the fluid pressure brake apparatus embodying the invention comprises a brake cylinder device 1 for actuating composition brake shoes 2 into engagement with a railway vehicle wheel 3 to effect the application of brakes on a railway car through the medium of the brake rigging 4 on such car; and an auxiliary fluid pressure cylinder device 5 cooperable with the brake rigging 4 to effect limited actuation thereof with sufficient force to overcome any resistance to such actuation which might be created by a heavy accumulation of ice thereon.

Referring particularly to Fig. 1 in the drawing, the fluid pressure brake cylinder device 1, for illustrative purposes, essentially comprises a hollow cylinder body 6 enclosed at one end by an integral pressure head 7 and at the opposite end by a removably-attached non-pressure head 8; and a piston 9, having the usual packing cup 10 thereon, reciprocably disposed within the hollow cylinder body 6 and constituting a movable abutment therewithin in subjection to pressure of fluid in a brake cylinder pressure chamber 11 on its face adjacent to the pressure head 7 and on its opposite face to force of a return spring 12 disposed in a non-pressure chamber 13 constantly open to the atmosphere by way of a vent port 14 in the non-pressure head 8. The fluid pressure brake cylinder device 1 further comprises the usual hollow piston rod 15 attached at one end centrally to the piston 9 through the medium of such as rivets 16 and a boss 17 shown as being formed integral with said piston 9. The piston rod 15, in the usual manner, is shown as extending coaxially through the non-pressure chamber 13 and through a central opening 18 in the non-pressure head 8 to the exterior thereof. As shown in the drawing a push rod 19 extends from the exterior into the hollow piston rod 15 into contact at its one end with the piston 9 within the boss 17. As shown in the drawing, the brake cylinder device 1 is adapted to be secured to a mounting means through the medium of the usual legs 20 which enable such brake cylinder device to be secured by means of bolts 21 to a mounting member such as an adapter bracket 22. The adapter bracket 22 in turn may be secured by means of such as bolts 23 to a member 24 of the truck frame of a railway vehicle, such, for example, as the side rail. Insofar as the invention is concerned, however, the showing in the drawing is merely illustrative of a possible arrangement for mounting the brake cylinder device 1 and it will be understood that other well-known mounting arrangements might be employed.

To provide for supply and release of fluid under pressure to and from the brake cylinder pressure chamber 11, the pressure head 7 is provided with a port 25 suitably connected for fluid pressure communication through the medium of fitting 26 with a brake cylinder pipe 27, which, in the usual manner of operation, will be connected to a brake controlling valve device (not shown), such as the well-known AB valve, for example, located elsewhere on the railway vehicle.

According to a feature of the invention as illustrated in the drawing, the auxiliary cylinder device 5 is carried on the exterior end of the push rod 19 associated with the brake cylinder device 1, which push rod, contrary to the usual practice, is rigidly connected to the hollow piston rod 15 by means of such as a transversely extending bolt 27a.

The cylinder device 5 comprises a casing divided into a non-pressure head 28 and a pressure head 29 in which is disposed a movable abutment in the form of a diaphragm 30 clamped at its outer peripheral edge between the non-pressure head 28 and the pressure head 29. As shown in the drawing the pressure head 29 is provided with a boss 31 projecting centrally from its outer face and having internal threads for screw-threaded connection with external threads formed on the projecting end of the push rod 19 to thereby provide for mounting of the device 5 thereon. The interior surface of the pressure head 29 cooperates with one face of the diaphragm 30 to define a pressure chamber 32 which is in constant fluid pressure communication with the brake cylinder pipe 27 through the medium of a port 33 in said pressure head 29 and a flexible hose 34.

The interior surface of the non-pressure head 28 cooperates with the adjacent face of the diaphragm 30 to define a non-pressure chamber 35 which is constantly open to the atmosphere by way of a port 36 formed in said non-pressure head. Disposed within the non-pressure chamber 35 there is a diaphragm follower member 37 and a return spring 38 cooperable therewith to urge same into engagement with the diaphragm 30 which in turn is urged in the direction of the pressure chamber 32 toward a repose position defined by engagement of said diaphragm with an annular shoulder 39 of the pressure head 29. The diaphragm follower member 37 is operatively connected, such as by integral attachment as shown in the drawing, to a boss 40 which in turn is suitably connected, such as by means of rivets 41, to one end of a hollow piston rod or tubular member 42 which extends outwardly of the non-pressure head 28 through a central opening 43 therein. Extending into the tubular member 42 and in contact at its one end with the follower member 37 there is a push rod 44 which is rigidly secured to the exterior end of such tubular member by means of a bolt 45. The exterior end of the push rod 44 is provided with a clevis 46 for operative connection to the brake rigging. In the illustrative example shown in the drawing, the clevis 46 is pin-connected at 47 to one end of a lever 48 fulcrummed at an intermediate fixed point 49 and operatively connected at its opposite end 50 to suitable links and levers comprised in the rigging 4 and connected for actuation of composition brake shoes 2.

Operation

In operation, assume initially that the fluid pressure brake apparatus shown in the drawing is devoid of fluid under pressure and that the components thereof are in their respective positions in which they are shown in the drawing. Upon supply of fluid under pressure to brake cylinder pipe 27 for initiating and effecting an application of the brakes on the railway car employing such apparatus, such fluid under pressure will flow from the pipe 27 to the brake cylinder pressure chamber 11 in the brake cylinder device 1 via fitting 26 and the passage 25, and, via the flexible hose 34 and port 33 in pressure head 29 of the device 5, will simultaneously also flow to the pressure chamber 32 in such device 5. Pressure of fluid in the brake cylinder pressure chamber 11 in the brake cylinder device 1 in acting on the piston 9 through the medium of the packing cup 10 will create a force on push rod 19 which tends to move said push rod 19, and attached cylinder device 5 including push rod 44 against opposition of the return spring 12 in said cylinder device to rock the lever 48 in a counterclockwise direction about fulcrum point 49 and thereby actuate, through the medium of the remaining members of the rigging 4, the brake shoes 2 into engagement with the wheel 3 for applying a braking force to such wheel, and such movement of the piston 9 normally will occur when such rigging is free to be so moved as will be the case when it is devoid of heavy accumulations of ice such as may exist during severe winter weather conditions.

Under the circumstances where the brake rigging 4 is heavily ice-laden and the pressurization of the brake cylinder pressure chamber 11 in the device 1 in acting on the piston 9 thereof does not create sufficient force on the lever 48 to actuate the rigging 4 against the opposition imposed by ice formation thereon, such piston 9 will remain motionless temporarily while the pressure of fluid in chamber 32 in cylinder device 5, in acting on the diaphragm 30, which has a relatively large area exposed to such fluid as compared to that of the piston 9, creates a superior force which will move follower member 37, and the abutting push rod 44 relative to pressure head 29 and brake cylinder device 1 in the direction of the non-pressure chamber 35 against opposition of the return spring 38 and of the restraint imposed by the ice-bound brake rigging 4 and thereby actuate the lever 48 in counterclockwise direction around fulcrum point 49 to break the ice formed on such rigging and free same for movement by the brake cylinder device 1 to advance the shoes 2 into braking engagement with the wheel 3.

Such movement of the follower member 37 relative to the brake cylinder device 1 in the direction of the non-pressure chamber 35 to free the brake rigging 4 will result in slight advancement of the brake shoes 2 in the direction of the wheel 3, but such advancement is limited by engagement of such follower member 37 with the inner wall of the non-pressure head 28 of device 5, and as employed in conjunction with the brake rigging 4 is intended merely to actuate the brake rigging only to the extent necessary to free same of its ice-bound condition without bringing the brake shoes into engagement with the wheel.

Immediately following such freeing of the brake rigging, the fluid under pressure in the brake cylinder pressure chamber 11 will become effective to move the piston 9 in the direction of non-pressure chamber 13 in opposition to return spring 12 and further advance the abutting push rod 19, the device 5 carried thereon, and push rod 44 of device 5 in the direction of the lever 48 to further rock same in a counterclockwise direction about its fulcrum point 49 to bring the brake shoes 2 into braking engagement with the wheel through the medium of the remaining members of the rigging 4 and effect a degree of exertion of the shoes with the wheel, hence a degree of brake application, according to the degree of pressurization of the brake cylinder pressure chamber 11. During such actuation of the lever 48 by the brake cylinder piston 9, through the medium of the cylinder device 5, the follower member 37 therein will remain in engagement with the inner wall of the non-pressure head 28 under influence of continued pressurization of chamber 32 acting on the diaphragm 30.

Under normal conditions of operation of the fluid pressure brake apparatus as shown in the drawing, where the brake rigging 4 is not ice-bound and is free for actuation, actuation of the diaphragm follower member 37 into engagement with the inner wall of the non-pressure head 28 in the device 5 and actuation of the brake cylinder piston 9 in the direction of non-pressure chamber 13 under influence of pressurization of the brake cylinder pressure chamber 11 may occur substantially at the same time, with the device 5 acting without consequence merely as an intermediary via which the pressure force delivered by the brake cylinder piston 9 is transmitted to the lever 48 for effecting braking engagement of the brake shoe 2 with the wheel 3.

Upon venting the brake cylinder pipe 27 to the atmosphere to effect the release of the brakes, fluid under pressure will flow to such pipe from the pressure chamber 32 in the device 5 by way of the port 33, and the flexible hose 34, and from the brake cylinder pressure chamber 11 in the brake cylinder device 1 by way of the port 25 and fitting 26, with consequent reduction in pressure of fluid in these chambers. Such reduction in pressure of fluid in chamber 32 will permit the return spring 38 in device 5 to move the diaphragm follower member 37, attached tubular member 42, and push rod 44 in the direction of pressure chamber 32 to the respective repose positions in which they are shown in the drawing as defined by engagement of the diaphragm 30 with the annular shoulder 39, while the reduction in pressure of fluid in the brake cylinder pressure chamber 11 will permit the return spring 12 in non-pressure chamber 13 to move the piston 9, attached piston rod 15, push rod 19, and the device 5, in the direction of said chamber 11 to their respective repose positions as defined by engagement of the packing cup 10 with the inner wall of the pressure head 7 of said device 1. Return of the follower member 37, attached tubular member 42 and push rod 44 of the device 5 to their repose positions as defined above will result in a limited extent of relative movement between the said push rod 44 and the push rod 19 of brake cylinder device 1, while the brake shoes 2 are returned to their release position by the brake rigging 4 as the device 5, including push rod 44, is returned to its position in which it is shown in the drawing relative to brake cylinder device 1, by action of the return spring 12 through the medium of piston 9, the boss 17, rivets 16, hollow piston rod 15, bolt 27a, and the push rod 19 to which said device 5 is attached.

Summary

From the foregoing it will be apparent that by provision of the auxiliary cylinder device 5 in interposition between the brake cylinder device 1 and the brake rigging 4 on a railway vehicle it is possible, by virtue of the relatively large force which may be created by such cylinder device 5 in comparison to that created by the brake cylinder device 1, to free an ice-bound brake rigging for actuation by a relatively small brake cylinder device to effect braking engagement of composition brake shoes with a railway vehicle wheel to exert a braking force thereon according to the degree of pressurization of such relatively small brake cylinder device.

Having now described the invention, what I claim as new and desire to secure by Letters Patent, is:

1. In a fluid pressure brake apparatus for actuating a brake rigging to effect a brake application on a railway vehicle, a brake cylinder pipe, a brake cylinder device and an auxiliary cylinder device each having fluid pressure operable movable abutment means operatively connected to said brake rigging for applying an actuating force thereto, means for conveying operating fluid under pressure from said brake cylinder pipe to the movable abutment means of both said brake cylinder device and said auxiliary cylinder device, the movable abutment means of said auxiliary cylinder device having a greater effective area subjected to fluid under pressure supplied thereto from said brake cylinder pipe than the similarly subjected effective area of the movable abutment means of said brake cylinder device, whereby said auxiliary cylinder device is rendered capable of initial actuation of said brake rigging under opposition of an ice-bound condition, and the movable abutment means of said auxiliary cylinder device being of limited travel relative to that of the movable abutment means of said brake cylinder device, whereby the degree of brake application resultant from actuation of said brake rigging is limited to that created by pressure of fluid acting on the abutment means of said brake cylinder device.

2. In a fluid pressure brake apparatus for effecting braking engagement of brake shoes with a railway wheel through the medium of brake rigging by movement of one end of a brake cylinder lever a certain distance corresponding to that required to move such shoes from a release position disposed away from the railway wheel to an application position in contact with said wheel, a brake cylinder pipe, a brake cylinder device having fluid pressure operable piston means and push rod means operable by said piston means, and an auxiliary cylinder device carried by the push rod means of said brake cylinder device, said auxiliary cylinder device having fluid pressure operable movable abutment means for movement relative to and in coaxial alignment with the piston means of said brake cylinder device and having a member actuable by said movable abutment means adapted for operative connection to the said one end of said brake cylinder lever, means for conveying operating fluid under pressure from said brake cylinder pipe to both said piston means and to said movable abutment means for subjecting same to pressure of fluid existing in said brake cylinder pipe, the movable abutment means of said auxiliary cylinder device presenting a greater effective area of exposure to brake cylinder pipe pressure than that presented by the piston means in said brake cylinder device and being capable of travel relative to said piston means of only a fraction of the certain distance movable by said one end of said brake cylinder lever, whereby, upon pressurization of said brake cylinder pipe, said auxiliary cylinder device will deliver a force to said one end of said brake cylinder lever for freeing said brake rigging under ice-bound conditions subsequent to which said brake cylinder device will further actuate said auxiliary cylinder device and said one end of said brake cylinder lever to effect braking engagement of said brake shoes with said wheel through the medium of said brake rigging.

3. In a fluid pressure brake apparatus for actuating brake rigging to advance brake shoes into contact with a rotaitng member for effecting a brake application on a railway car, a brake cylinder pipe; a brake cylinder device comprising brake cylinder casing means adapted to be secured to the truck frame of a railway car, piston means reciprocably mounted in said brake cylinder casing means and subject on one face to pressure of fluid in a brake cylinder pressure chamber open to said brake cylinder pipe, piston return spring means acting on said piston means in opposition to brake cylinder pipe pressure existing in said brake cylinder pressure chamber, a hollow piston rod attached centrally to said piston means coaxially therewith and extending from the face thereof opposite to that subject to pressure of fluid in said brake cylinder pressure chamber outwardly of said brake cylinder casing means in slidably guided cooperation therewith, a brake cylinder push rod extending from the exterior of said casing means through said hollow piston rod into abutting contact with said piston means, and means connecting said brake cylinder push rod to said hollow piston rod; and an auxiliary cylinder device comprising a divided casing secured to and carried by the exterior end of said brake cylinder push rod, a flexible diaphragm of larger effective area than that of said piston means and clamped at its outer periphery between portions of said divided casing in coaxial alignment with said brake cylinder push rod and subject to pressure of fluid in a fluid pressure chamber open to said brake cylinder pipe for deflection in a direction away from said brake cylinder push rod, a diaphragm follower member disposed in said divided casing in contact with the face of said diaphragm opposite to that subject to brake cylinder pipe pressure for actuation thereby to a limit position defined by contact with said casing, diaphragm return spring means cooperable with said follower member to exert a force on said diaphragm acting in opposition to brake cylinder pipe pressure existing in said fluid pressure chamber, a hollow tubular member attached centrally to said diaphragm follower member in coaxial alignment with said diaphragm and extending in a direction opposite thereto outwardly of said divided casing means in slidably guided cooperation therewith, a second push rod extending from the exterior of said divided casing through said hollow tubular member into abutting contact with said diaphragm follower member, means attaching said second push rod to said hollow tubular member, and clevis means attached to the exterior projecting end of said second push rod to adapt same for operative connection with said brake rigging; the travel of said follower member in said auxiliary cylinder device being less than that of said piston means in said brake cylinder device whereby, upon pressurization of said brake cylinder pipe, said auxiliary cylinder device will deliver a force to said brake rigging for freeing same from an ice-bound condition and subsequent to which said brake cylinder device will further actuate said auxiliary cylinder device and said rigging to advance the brake shoes into braking engagement with the rotating member to be braked.

References Cited in the file of this patent

UNITED STATES PATENTS 2,626,021    McAlpine    Jan. 20, 1953